July 19, 1966     L. SUMMERS     3,261,303
OVERHEAD HAULAGE SYSTEMS

Filed July 6, 1965     2 Sheets-Sheet 1

INVENTOR
LEONARD SUMMERS
By Shoemaker and Mattare
ATTYS.

United States Patent Office 3,261,303
Patented July 19, 1966

1

3,261,303
OVERHEAD HAULAGE SYSTEMS
Leonard Summers, Johannesburg, Transvaal, Republic of South Africa, assignor to Anglo-Transvaal Consolidated Investment Company Limited, Johannesburg, Transvaal, Republic of South Africa
Filed July 6, 1965, Ser. No. 469,771
Claims priority, application Republic of South Africa, July 10, 1964, 64/3,274
3 Claims. (Cl. 105—73)

This invention relates to locomotives for overhead haulage systems which are particularly suitable for use in monorail systems wherein the locomotive is coupled to a train of carriages or cars.

In the specification of United States of America Patent No. 3,176,628 there is described a locomotive including an assembly which enables a pressure between the wheels of the locomotive and the track to be varied in accordance with the load to be propelled. This is achieved by having the locomotive suspended from track engaging wheels by swingeable links rotatably secured to the locomotive frame. The latter carries a drive wheel adapted to engage the undersurface of the track and initial pressure is applied and must be applied against the weight of the locomotive body.

It is the object of this invention to provide an improvement to the above invention whereby the weight of the locomotive can be used to assist in the adhesion between the drive wheel and the track. This will give a more positive initial grip between the drive wheel and track while also improving the capital and running costs of the locomotive.

According to this invention there is provided a locomotive adapted to be suspended from an overhead track said locomotive comprising a rigid frame, a pair of upper wheel assemblies and a pair of lower wheel assemblies, swingable rigid links each connected to one upper wheel assembly and one lower wheel assembly and said frame wherein the points of connection to the lower wheel assemblies and frame are off-set on either side of the pivot point for the upper wheel assembly, a driving motor carried by the locomotive frame and operatively connected to one pair of wheel assemblies and a draw-bar for connecting the load to the other pair of wheel assemblies.

Other features of this invention will become apparent from the further description below.

Figure 1:
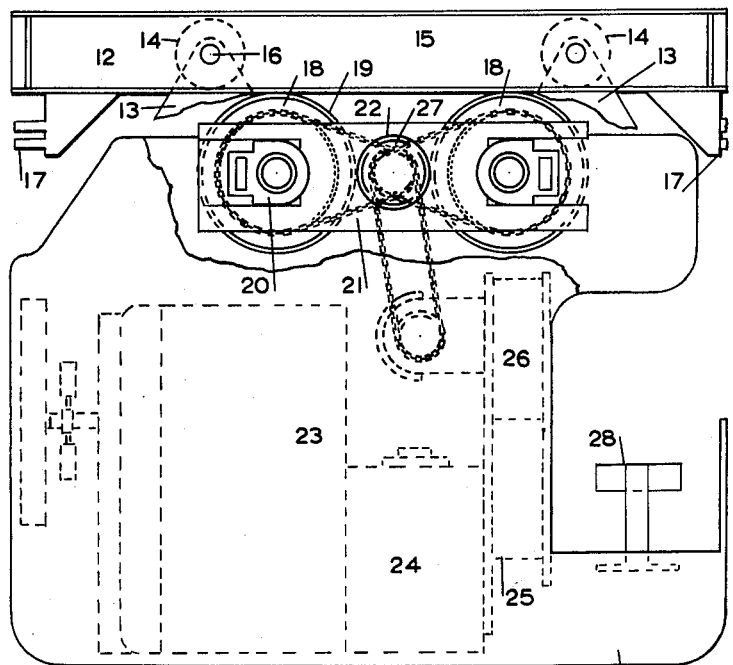
Figure 3:
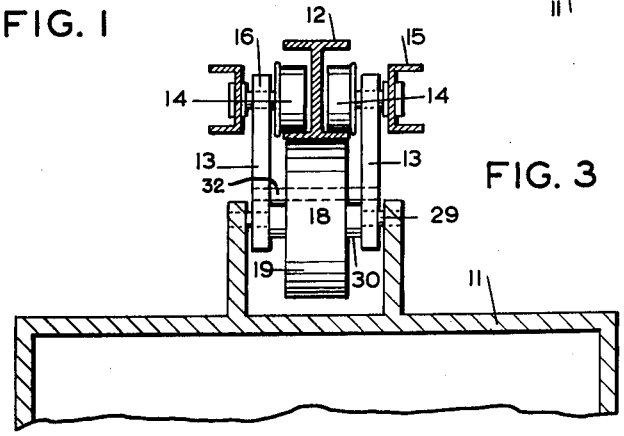
Figure 2:
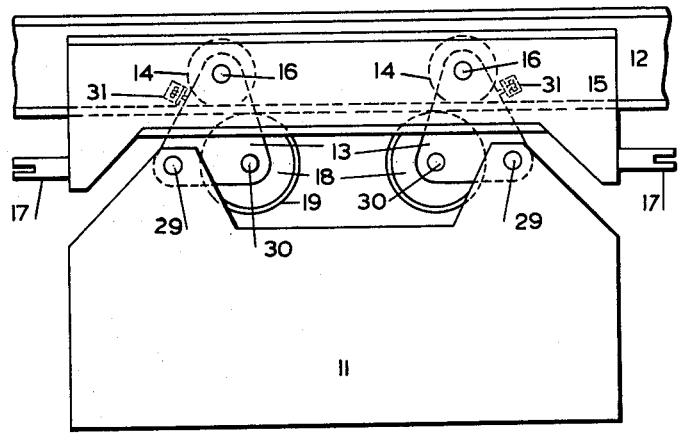

A preferred form of this invention will be illustrated with reference to the accompanying drawings in which:

FIG. 1 is a diagrammatic side elevation showing a layout of a locomotive and drive arrangement suitable for use with this invention, and FIGS. 2 and 3 are diagrammatic views showing the principle of construction according to this invention.

Referring now to FIG. 1 the locomotive frame 11 is suspended from a track 12 in the form of an I beam by pairs of links 13 pivotally connected to corresponding sides of the frame 11 and to the axles of two pairs of running wheels 14. The latter are mounted on a frame 15 of channel section carrying inwardly projecting stub axles 16. Shackles 17 or the like are provided at each end of frame 15 for connection of a load thereto.

Two driving wheels 18 are used each fitted with a rubber tyre 19 and mounted on slides 20. The driving wheel assembly is supported by a bogie 21 rotatable on an axle 22 to allow for adjustment of position of the driving wheels 18 when traversing a portion of track which changes its angular inclination in a vertical plane. This arrangement is not necessary when a single driving wheel is used.

2

Any suitable form of drive mechanism may be used to drive the wheels 18 such as the assembly illustrated in FIG. 1, mainly in dotted lines, and consisting of diesel engine 23, torque converter 24, two-speed gearbox 25, 26, connected by means of a chain drive to the sprocket 27, co-axial with axles 22 and connected by driving chains to the driving wheels 18. A driving seat 28 is provided and also the necessary controls (not shown).

In FIGS. 2 and 3 the locomotive frame is only diagrammatically illustrated and portions of the drive mechanism are omitted for clarity, since they form no part of this invention.

As is illustrated in FIGS. 2 and 3 the pair of swingable links 13 in the form of rigid triangular structures are rotatably connected one to each free running wheel assembly 14 to pivot on the axes of axles 16 of these wheels. The links 13 are connected here at substantially the apex of the triangular structure forming the link.

The lower outer corner pivots 29 of the swingable links 13 are pivotally connected to the locomotive frame 11 in a manner which will permit the frame to tilt longitudinally relative to the links. This can be obtained by having a further small link between lower corner pivots 29 and frame 11 or by having the pivot connections movable in guides in frame 11. The inner lower corners of the link structure are rotatably connected to pivot at 30 one about each of the pair of drive wheels 18. These drive wheels 18 are positioned to engage the undersurface of the track as is also shown in FIG. 1.

With the assembly as above described it will be appreciated that the lower corner pivots 29, 30 of each swingable link 13 are located on each side of the line through the upper corner pivot formed by axle 16 at right angles to the track 12. The weight of the locomotive thus tends to swing the links 13 about the pivotal centers of the stub axles 16 consequently forcing the drive wheels 18 into engagement with the undersurface of the track 12. The force applied to the wheel 18 by the weight of the locomotive is dependent on the ratio of the distances between the centers of the lower corner pivots 29, 30 of the swingable link 13 and a line through the center of stub axle 16 vertical to the track 12.

The assembly above described has the added advantage in that the swingable link assemblies act automatically to take up wear of the drive wheels 18.

While it is convenient to utilise the wheel axles 16 as pivots for the upper ends of the link arms 13 they could, if desired, be pivotally connected to the frame 15.

As stated the links 13 each comprises, one member of a pair and one member of each pair is located on each side of the track 12 with the arms joined by a cross-member 32 as will be more clearly seen from FIG. 3 which illustrates the relationship of the running and driving wheels, the running wheel frame, bearing, and the link arms 13.

It will be appreciated that longitudinal movement of the draw-bar 17 relative to the frame 11 dependent on the load will increase the pressure applied by the drive wheel 18 forming the rear wheel for a particular direction of travel. Adjustable stops 31 will be secured to the frame 15 to prevent the other drive wheel 18 from having reduced contact pressure on the rail 12 due to the draw-bar movement above referred to.

What I claim as new and desire to secure by Letters Patent is:

1. A locomotive adapted to be suspended from an overhead track, said locomotive comprising a rigid main frame, a secondary frame, two pairs of free running wheels the members of each pair being coaxial and each wheel mounted on a corresponding stub axle projecting inwardly from the secondary frame, parallel link arms of triangular shape rotatably suspended from each stub axle with one lower corner of each link arm pivotally connected to the main frame, and the other lower free corner of each link arm supporting a drive wheel positioned between the pairs of free running wheels and a drawbar connected to the secondary frame.

2. A locomotive as claimed in claim 1, in which the lower wheel assemblies are interconnected to be driven in unison from the drive motor.

3. A locomotive as claimed in claim 1, in which adjustable stops are provided to limit the movement of said swingingly suspended links relative to the frame to one direction only.

References Cited by the Examiner

UNITED STATES PATENTS

| | | |
|---|---|---|
| 1,024,084 | 4/1912 | Kintner. |
| 2,063,471 | 12/1936 | Stadfeld _____ 105—130 X |
| 3,101,678 | 8/1963 | Grube _____ 105—153 X |
| 3,176,628 | 4/1965 | Reid _____ 105—73 |

FOREIGN PATENTS 510,229   7/1918   France.

ARTHUR L. LA POINT, *Primary Examiner.*

B. S. FAUST, D. HOFFMAN, *Assistant Examiners.*